United States Patent [19]

Ollivier

[11] Patent Number: 5,787,925

[45] Date of Patent: Aug. 4, 1998

[54] PNEUMATICALLY SERVOED GAS PRESSURE REGULATOR

[75] Inventor: Louis A. Ollivier, Palo Alto, Calif.

[73] Assignee: Veriflo Corporation, Richmond, Calif.

[21] Appl. No.: 678,597

[22] Filed: Jul. 15, 1996

[51] Int. Cl.$^6$ ............................................. F16K 31/21
[52] U.S. Cl. ................................. 138/489.5; 137/492.5; 137/505.14
[58] Field of Search .................... 137/505.14, 489.5, 137/492.5, 906

[56] References Cited

U.S. PATENT DOCUMENTS

| | | | |
|---|---|---|---|
| 2,984,251 | 5/1961 | Quinby | 137/505.14 |
| 3,807,439 | 4/1974 | Doe | 137/489.5 |
| 3,934,607 | 1/1976 | Revesz | 137/489.5 |
| 4,757,839 | 7/1988 | Marchal | 137/489.5 |
| 4,791,954 | 12/1988 | Hasegawa | 137/489.5 |
| 5,097,858 | 3/1992 | Zlokovitz et al. | 137/492.5 |
| 5,348,036 | 9/1994 | Oksanen et al. | 137/489.5 |
| 5,460,196 | 10/1995 | Yonnet | 137/489.5 |

FOREIGN PATENT DOCUMENTS 516270  12/1930  Germany ............... 137/505.14

*Primary Examiner*—Henry A. Bennett
*Assistant Examiner*—Joanne Y. Kim
*Attorney, Agent, or Firm*—Antonelli, Terry, Stout & Kraus, LLP

[57] ABSTRACT

A pneumatically servoed gas pressure regulator capable of providing a relatively wide range of gas flow rates with precision outlet pressure control includes a dome loaded gas pressure regulator and a pressure sensor controller integrated in a single unit. The controller senses the regulator outlet gas pressure, compares it to a pressure setting of the controller, and operates a pneumatic servo valve of the controller for generating a control signal dome gas pressure for the dome loaded gas pressure regulator as a function of the deviation between the sensed outlet pressure and the pressure setting of the controller, independently of the gas through flow rate. A relatively large change in the size of the valved passage in the regulator is made with only a relatively small deviation of less than or equal to a few psi between the sensed outlet pressure and the pressure setting of the controller. The relatively large change in the size of the passage in the regulator effectively uses the entire flow capacity $C_v$ of the regulator for precise controlling the outlet gas pressure over a relatively wide range of gas flow rates.

16 Claims, 4 Drawing Sheets

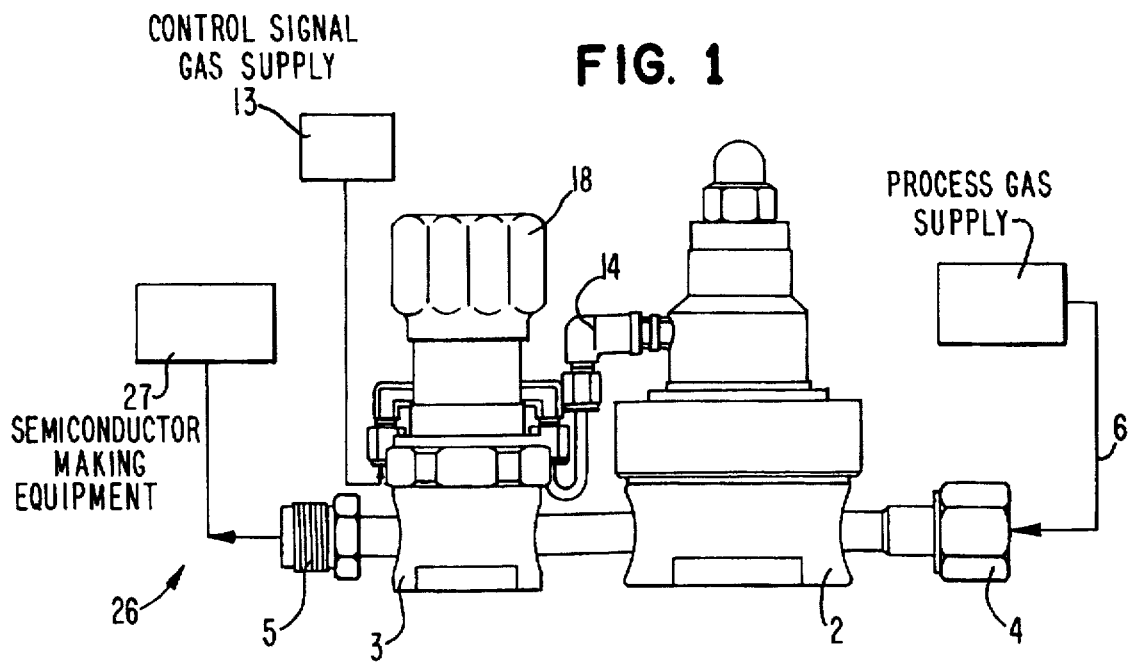
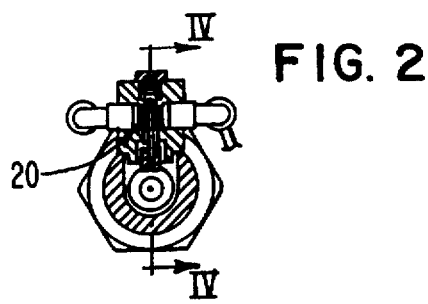
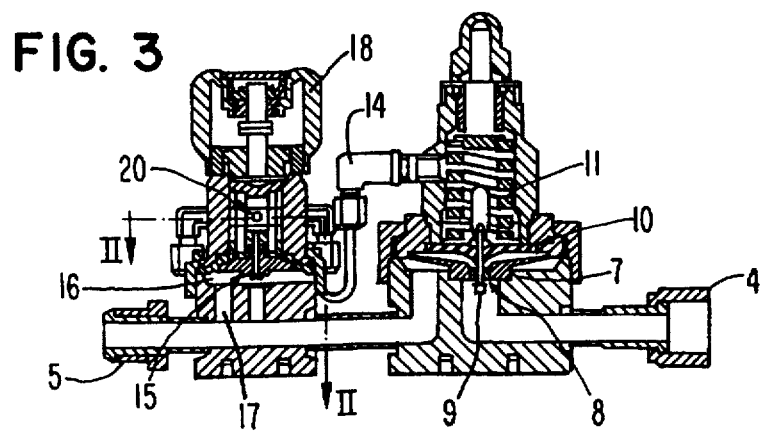

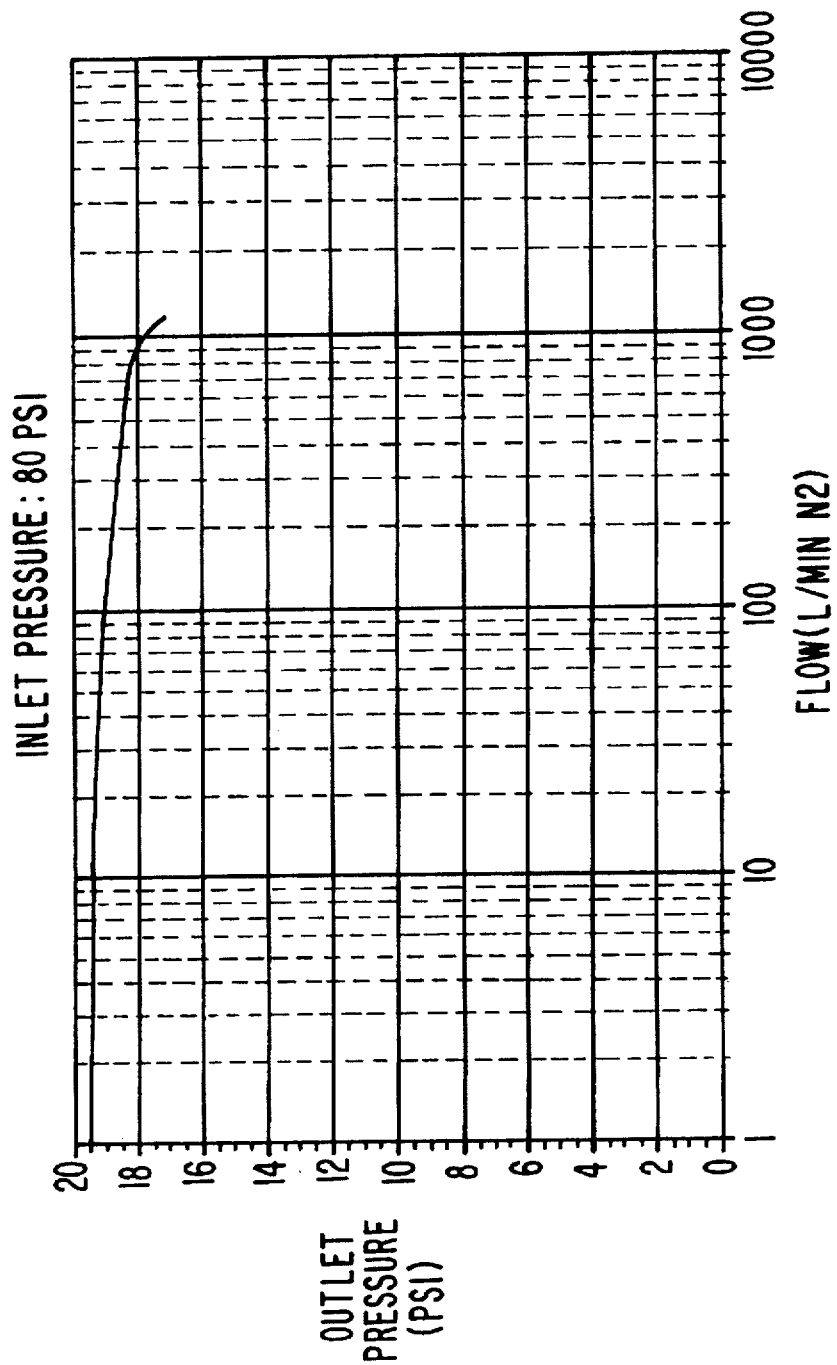

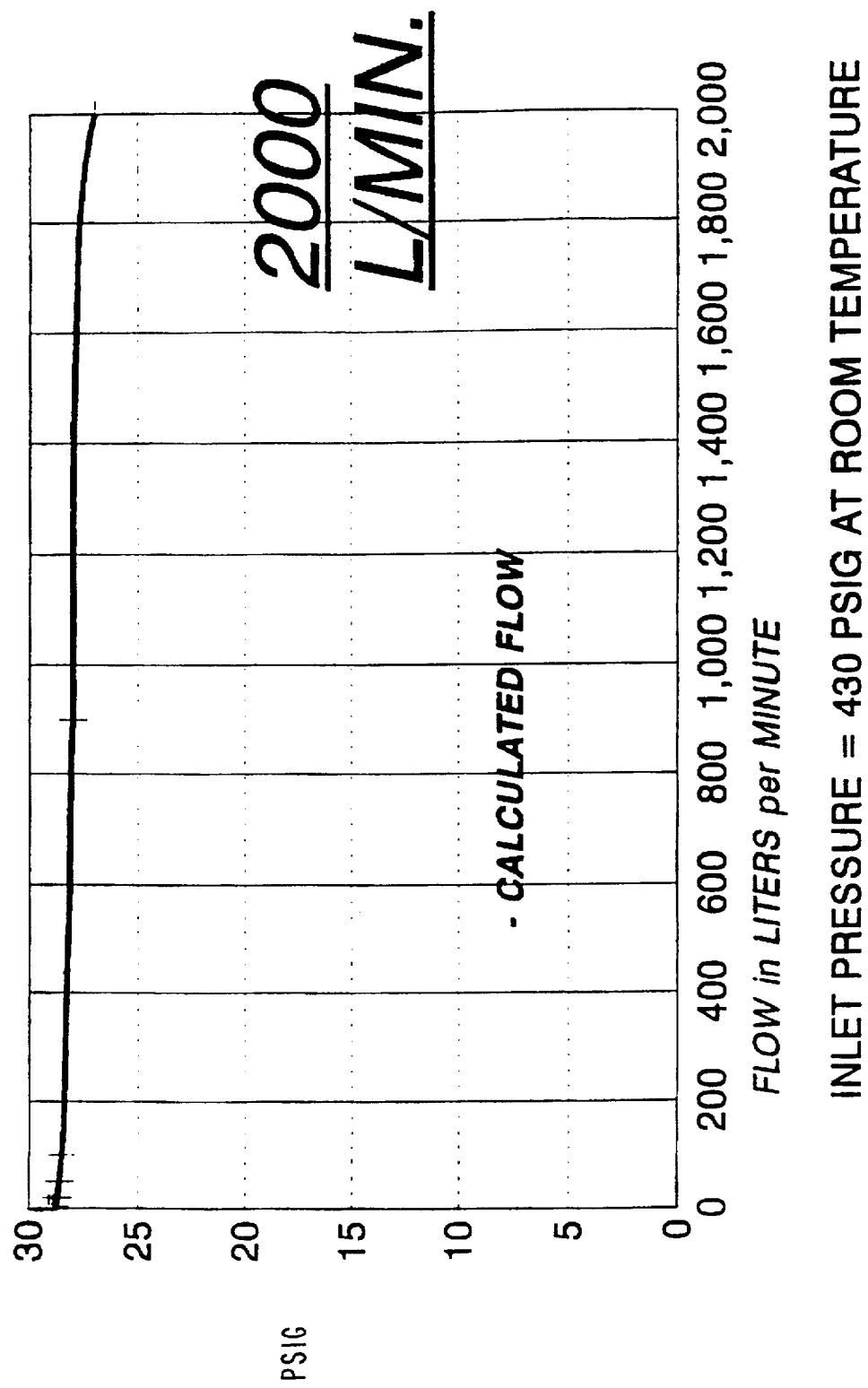

PNEUMATICALLY SERVOED GAS PRESSURE REGULATOR

FIELD OF THE INVENTION

The present invention is directed to an improved servoed gas pressure regulator capable of providing a relatively wide range of gas flow rates with precision outlet pressure control. The regulator is particularly useful for supplying process gases for making semiconductors.

BACKGROUND AND SUMMARY OF THE INVENTION

Conventional pressure regulators exhibit an excessive outlet pressure drop (up to 10 psi) as the flow is increased to its high value. This problem is especially troublesome where differential pressure between the inlet and outlet of the regulator is small and it is required to maintain an outlet pressure within a narrow band, 2 to 3 psi for example, while the flow varies in a very wide range, up to 1000 L/min or more for example.

Electrically servoed regulators have been proposed for different applications but there is a need for a more powerful regulator which provides extremely high flows under precise control, without the complexity of electronic devices. More particularly, there is a need for an improved gas pressure regulator which minimizes the difference between the pressure setting of the regulator and the regulator outlet pressure, regardless of the flow.

An object of the present invention is to provide an improved gas pressure regulator which overcomes these drawbacks and disadvantages of the conventional gas pressure regulators. More specifically, an object of the present invention is to provide an improved gas pressure regulator capable of providing a relatively wide range of gas flow rates with precision outlet pressure control such that the outlet pressure drop does not exceed 5 psi while the flow varies over the full range of the regulator.

Another object of the invention is to provide an improved pneumatically servoed gas pressure regulator capable of providing a relatively wide range of gas flow rates with precision outlet pressure control, without the need for complex electronic devices.

These and other objects of the invention are attained by the improved pneumatically servoed gas pressure regulator of the invention which comprises a dome loaded gas pressure regulator having an inlet for the flow of pressurized gas to be regulated, an outlet for the flow of pressurized gas regulated by the regulator, a control valve-seat assembly for adjusting the size of the passage for the flow of pressurized gas through the regulator to control the flow of pressurized gas through the regulator, and means for receiving a control signal dome pressure and adjusting the size of the passage in the regulator at the control valve-seat assembly for creating a regulator outlet gas pressure proportional to the control signal gas pressure.

The pneumatically servoed gas pressure regulator of the invention further includes a pressure sensor controller means for sensing the regulator outlet gas pressure, comparing it to a pressure setting of the controller means, and operating a pneumatic servo valve of the controller means for generating a control signal dome gas pressure for the dome loaded gas pressure regulator as a function of the deviation between the sensed outlet pressure and the pressure setting of the controller means. In a disclosed embodiment of the invention, this control signal dome gas pressure is generated independently of the through flow rate of the regulator. The dome loaded gas pressure regulator and the pressure sensor controller means in the disclosed embodiment are integrated into a single unit with inlet and outlet fittings for convenient incorporation into a gas delivery line.

The precision outlet pressure control over a relatively wide range of gas flow rates is achieved with the improved gas pressure regulator of the invention in that the pressure sensor controller means generates a control signal gas pressure for creating a relatively large change in the size of the passage in the regulator with only a relatively small deviation of a few psi or less between the sensed outlet pressure and the pressure setting of the controller means of the regulator. The relatively large change in the size of the passage preferably effectively uses at least substantially the full flow capacity $C_v$ of the dome loaded gas pressure regulator. The relatively wide range of gas flow rates is at least 1000 L/min in the illustrated embodiment and an outlet pressure drop over the relatively wide range of gas flow rates does not exceed 5 psi for a given pressure setting of the controller means. For a given gas flow rate, the regulator controls the outlet pressure within ±0.25 psi for a given pressure setting of the controller means.

The pressure sensor controller means in the disclosed embodiment includes a movable servo sensor diaphragm having one side in communication with the regulator outlet pressure for sensing the regulator outlet pressure without obstructing the outlet flow, with a mechanical pressure according to the pressure setting of the controller means acting on an opposite side of the diaphragm. A servo control mechanism is moved in response to movement of the servo sensor diaphragm for operating a pneumatic servo valve for supplying pressurized control signal gas to the dome of the dome loaded pressure regulator. The servo control mechanism in the illustrated embodiment comprises a control lever actuated by movement of the servo sensor diaphragm and a pin control assembly with a pin which is axially moved when actuated by the control lever for operating the pneumatic servo valve.

The pressure sensor controller means in the disclosed embodiment further comprises a dome pressure bleed control for bleeding the control signal gas pressure from the dome loaded gas pressure regulator. It has been found that the use of a small continuous bleed, one liter/minute or less, eliminates the effect of an initial outlet pressure drop from creep, which tends to increase as the flow capacity of the regulator is increased.

The supply of control signal gas to operate the sensor controller means and pressurize the dome of the regulator may be derived from the supply of gas being regulated by the gas pressure regulator. This is practical in those applications where the gas being regulated is an inert process gas for making semiconductors, for example. However, it is preferable to use a separate control signal gas supply which supplies a gas such as nitrogen. This insures a total separation of the control circuit from the delivery line in which the regulator is operating. In either case, the consumption of the control signal gas is relatively small, less than 1 L/min as noted above. The pressure of the control signal gas supply is preferably at least 20 psi greater than a maximum required outlet pressure of the regulator.

The present invention is further directed to an apparatus for supplying process gases for making semiconductors which utilizes the pneumatic servoed gas pressure regulator of the invention. The apparatus comprises a bulk supply of a relatively high pressure process gas for making semiconductors. Advantageously, a single stage reduction of high-use, dangerous process gases is achieved where the regulator of the invention is connected to the bulk supply, such as a trailer, and reduces the pressure from, for example, 750 psig to 30 psig at flows reaching 2000 L/min. In service, the apparatus will deliver the gas to semiconductor processing equipment at a drop in pressure only 2 to 3 psig. Supply pressure effect is minimal and the 30 psig line outlet pressure can be regulated to less than 2 psig over the entire range of flows. With this apparatus, depending upon the gas piping system, the outlet pressures of the regulator can be set at higher levels, such as 60 psig or lower down to a very few psig.

These and other objects, features and advantages of the present invention will become more apparent from the following description when taken in connection with the accompanying drawings which show, for purposes of illustration only, one embodiment in accordance with the present invention.

BRIEF DESCRIPTION OF THE DRAWINGS

FIG. 1 is a side, elevational view of a pneumatic servoed gas pressure regulator according to a preferred embodiment of the present invention in an otherwise schematically illustrated apparatus according to the invention for supplying process gases for making semiconductors;

FIG. 2 is a cross sectional view of the pressure sensor controller of the regulator taken along the line II—II in FIG. 3;

FIG. 3 is a cross sectional view of the regulator of FIG. 1 taken along a longitudinal central axis thereof;

FIG. 6 is a flow curve of a regulator according to the invention showing an outlet pressure change of less than 3 psi as the flow increases from 500 cc/min to over 1000 L/min; and FIG. 7 is a typical flow curve for a regulator of the invention in an apparatus of the invention as depicted in FIG. 1, the regulator having a flow coefficient $C_v$ of 0.75 where the regulator is used to supply hexafluoroethene from a bulk supply in a single stage reduction for use as a process gas in making semiconductors at flows reaching 2000 L/min.

DETAILED DESCRIPTION OF DISCLOSED EMBODIMENT

Figure 4:
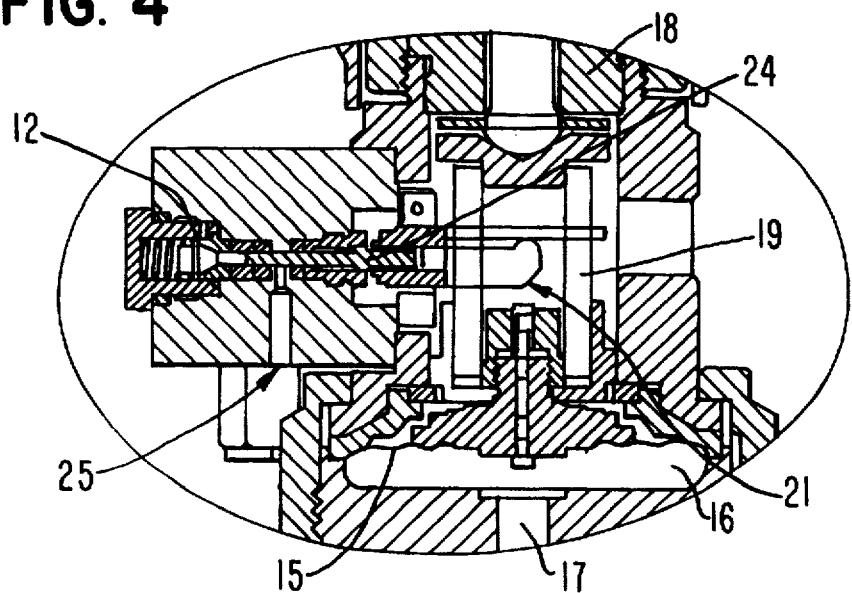
FIG. 4 is an enlarged cross sectional view of the servo control mechanism and dome pressure control valve of the pressure sensor controller taken along the line IV—IV of the regulator as depicted in FIG. 2.

Some pressure regulation applications are concerned with systems in which the differential pressure between inlet and outlet is small and it is required to maintain a pressure within a narrow band, 2 to 3 psi, while the flow varies in a very wide range. Typical applications include:

- inlet pressure at 60 to 80 psi, outlet pressure at 20 to 30 psi, flow 50 to 100 L/min;
- inlet pressure at 100 psi nominal, outlet pressure at 60 to 80 psi, flow up to 300 L/min; and
- inlet pressure at 120 to 150 psi, outlet pressure at 100 psi nominal, flow up to 1000 L/min.

In other applications the differential pressure between the inlet and outlet is small and the regulated outlet pressure drop must be only a few psi, 2 to 5 psi for example, as the flow is increased to a very high value, exceeding 1000 L/min, for example. A typical application of this type may have an inlet pressure of 80 psi, and outlet pressure setting of 60 psi and a maximum flow of 1500 L/min. Conventional pressure regulators applied to these conditions exhibit an excessive pressure drop, up to 10 psi for example, as the flow is increased to its high value.

The gas pressure regulator 1 of the disclosed embodiment of the invention as depicted in the application drawings provides a relatively wide range of gas flow rates with precision outlet pressure control wherein the outlet pressure drop over the relatively wide range of gas flow rates for a given pressure setting of the regulator does not exceed 5 psi, and in some cases is maintained within 2 psi. The gas pressure regulator of the invention is a pneumatically servoed gas pressure regulator which comprises a dome loaded gas pressure regulator 2 and a pressure sensor controller 3 integrated into a unit by welding with inlet and outlet fittings 4 and 5, respectively, being provided on the unit for convenient incorporation into a delivery line 6 as shown schematically in FIG. 1.

The dome loaded gas pressure regulator 2 has an inlet with inlet fitting 4 thereon for the flow of pressurized gas to be regulated. An outlet with outlet fitting 5 thereon is for the flow of pressurized gas regulated by the regulator. The regulator 2 further includes a control valve-seat assembly 7 having a dynamic valve seat 8 and a control valve 9 mounted for movement on a movable regulator diaphragm 10 for adjusting the size of a passage through the valve seat for pressurized gas flowing in the regulator to control the flow of pressurized gas through the regulator.

The dome loaded gas pressure regulator 2 is a high flow regulator having a chamber 11 located above the movable regulator diaphragm 10 for receiving a pressurized control gas. The regulator 2 creates a regulator gas pressure at its outlet proportional to the control signal gas pressure introduced into the chamber 11. Dome loaded gas pressure regulators, per se, are known.

The pressure sensor controller 3 of the regulator 1 senses the outlet pressure of the regulator without obstructing the outlet flow, compares it to a pressure setting of the controller and operates a pneumatic servo valve 12 of the controller for generating the control signal dome gas pressure for the dome loaded gas pressure regulator 2 as a function of the deviation between the sensed outlet pressure and the pressure setting of the controller, independently of the regulator gas through flow rate. The pneumatic servo valve 12 is a dome pressure control valve which controls the pressure of the control signal gas supplied to the dome of the regulator 2 from a supply 13 by way of a delivery line 14 from the valve 12 to the dome of the regulator 2, see FIG. 3.

A servo sensor diaphragm 15 of the controller 3 is mounted for movement in the controller with the lower side of the diaphragm being exposed to the outlet gas pressure which is communicated to chamber 16 adjacent the diaphragm via passages 17 as shown in FIG. 3. The outlet pressure of the regulator is set by rotatably adjusting knob 18 on the controller to adjustably load the upper surface of the servo sensor diaphragm 15 with a downward force by way of spring 19. Fluctuations in the outlet pressure of the regulator as sensed by the controller 3 result in up and down movements of the servo sensor diaphragm 15 according to the force-balance principle. A servo control mechanism 20 translates this motion of the diaphragm 15 to the pneumatic servo valve/dome pressure control valve 12 for generating a control signal dome gas pressure for the dome loaded gas pressure regulator 2 as a function of the deviation between the sensed outlet pressure and the pressure setting of the controller.

The pressure sensor controller 3 according to the invention generates a control signal gas pressure for creating a relatively large change in the size of the passage in the regulator 2, at the control valve-seat assembly 7, with only a relatively small deviation of less than or equal to a few psi between the sensed outlet pressure of the regulator and the pressure setting thereof. According to the disclosed embodiment, the relatively large change in the size of the passage through the regulator 2 by way of the control valve-seat assembly 7 effectively uses the entire flow capacity $C_v$ of the dome loaded gas pressure regulator for precisely controlling the regulator outlet gas pressure over its relatively wide range of gas flow rates.

Figure 5:
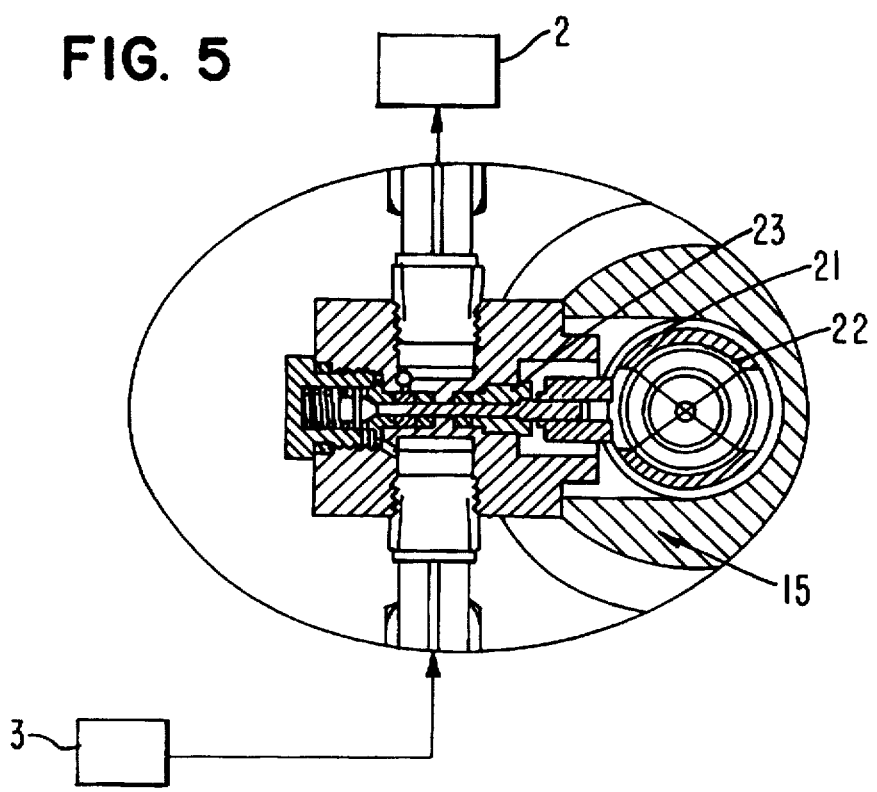
FIG. 5 is an enlarged view, partially in cross section of the control assembly depicted in FIG. 2 for regulating the pressure administered to the dome of the pressure regulator.

The servo control mechanism 20 comprises a wish-bone shaped control lever 21, see FIG. 5, pivotally connected to opposite, outer surfaces of a cylindrical sleeve 22 mounted on the servo sensor diaphragm 15 for movement therewith. The upward motion of the diaphragm 15 results in axial translation of the free, left end of the control lever 21 as shown in FIG. 4. This axial movement is in turn transmitted to a pin 23 of a pin control assembly 24 for opening and closing the dome pressure control valve 12 with upward and downward movement of the diaphragm 15.

The pressure sensor controller 3 further comprises a dome pressure bleed control 25 for continuously bleeding the control signal gas pressure from the dome of the gas pressure regulator. It has been found that the provision of a small continuous bleed of one L/min or less of the control gas, during the operation of the regulator eliminates the effect of an initial pressure drop from creep upon increasing the flow through the regulator.

The pressure sensing-servo valve mechanism of the controller 3 smoothly controls the outlet pressure of the regulator to ±0.25 psi of the set value for a given flow rate. The pneumatic servo valve 12, integrated with the dome loaded gas pressure regulator 2, serves to "amplify" the control signal to a level that causes the servo to precisely maintain the pressure set by way of pressure setting knob 18. As a result of these features of the invention, the regulator 1 of the invention can provide extremely high flows under precise control, without the complexity of electronic devices. It requires no electrical power, yet can function over a relatively long life, using only house nitrogen., for example, for actuation. As noted previously, the supply pressure of the gas being regulated can itself be used to operate the sensor controller, most practically where the application concerned uses inert process gas. However, it is preferable to use a house nitrogen source, for example, as the control signal gas supply. In either case, the consumption is small, typically less than one L/min. The pressure of the control gas is preferably at least 20 psi greater than a maximum required outlet pressure of the regulator.

In the disclosed embodiment, the regulator is an ultra high flow high purity pressure reducing regulator constructed of stainless steel, with Hastelloy diaphragm and poppet. The process gas passages through the regulator 1 are electropolished and the process gases flowing therethrough are sealed from the atmosphere and from the control gas with well known metal-to-metal seals. The regulator 2 is a tied diaphragm dome loaded type regulator capable of providing flow rates in excess of 1000 L/min.

The gas pressure regulator 1 in the disclosed invention is only 9 inches in length, fitting-to-fitting. Its size, shape and height above the mounting surface are similar to regulators now in use, requiring little modification of the installed tubing. The unit is much more compact than the bulky non-servo regulators currently used for high flows. Since there are no sliding parts or springs in the process gas passages of the regulator, particles generated by some regulators are not a problem with the regulator of the invention. As noted above, the dome loaded gas pressure regulator 2 and pressure sensor controller 3 are integrated in a single, welded package that requires only inlet and outlet connections and a connection for the control gas supply. It functions automatically, with pressures set by means of the pressure control knob on the pressure sensor controller 3.

An apparatus 26 for supplying process gases from a supply 13 to semiconductor making equipment 27 is schematically depicted in FIG. 1. In this application, the gas pressure regulator 1 of the invention is employed in a single stage reduction for high-use, dangerous process gases, where the regulator 1 is connected to the bulk supply 13, such as a trailer, and reduces the pressure from 750 psig to 30 psig, for example, at flows reaching 2000 L/min. As an example, the process gas in this bulk gas system could be HCl. It has been found that a regulator 1 according to the invention will deliver the gas at a drop in pressure of only 2 to 3 psig. Supply pressure effect is minimal and the 30 psig line pressure will be regulated to less than 2 psig over the entire range of flow rates. Depending upon the gas piping system, the outlet pressure can be set at higher levels, such as 60 psig, or lower, down to a very few psig.

Regulators 1 according to the invention have been made with flow coefficients $C_v$ of 0.26, 0.75 and 1.5, respectively. For optimum performance it is desirable to select the regulator with the lowest $C_v$ which will provide the desired flow. The regulator with the highest $C_v$ is useful, for example, in an application in which the differential pressure between inlet and outlet is small and the regulator outlet pressure drop must be only a few psi (2 to 5) as the flow is increased to a very high value. One application involved an inlet pressure of 80 psi and an outlet pressures of 60 psi and a flow up to 1800 L/min (nitrogen). The regulator of the invention met such requirements with an outlet pressure drop of only 2 psi at 1500 L/min and 5 psi drop at 1800 L/min.

If the differential pressure between the regulator inlet and outlet is greater than 20 psi, for example 250 psi inlet and 30 psi outlet, the pressure drop at 1500 L/min and at 1800 L/min will be reduced to 2 psi. At higher inlet pressure the highest maximum flow will be increased to more than 5000 L/min. Two flow curves for regulators according to the invention are depicted in FIGS. 6 and 7 of the drawings. The flow curve of outlet pressure versus flow rate shown in FIG. 6 depicts an outlet pressure change of less than 3 psi as the flow increases from 500 CC/min to over 1000 L/min. The flow curve of FIG. 7 of outlet pressure versus calculated flow for a regulator according to the invention having a flow coefficient $C_v$ of 0.75 is for controlling the flow of hexfluoroethene gas with inlet pressure at 430 psig at room temperature. Heavier gases will cause the maximum flows through the regulator to decrease by a factor equal to the square root of the ratio of the density of the process gas to the density of the air. The outlet pressure ranges of the regulators of the invention are 0 to 60 psi. Any process gas inlet pressure up to 1250 psi can be used with the regulators having flow coefficients of 0.26 or 0.75. The regulator having a flow coefficient $C_v$ of 1.5 is rated at a maximum inlet pressure of 250 psi. Each of these regulators produce maximum flows on the order of 2000 L/min or higher, depending on the inlet pressure. The maximum calculated outlet flow at a pressure drop of 3 psig, is directly proportional to the ratio of the absolute inlet pressure.

While I have shown and described only one embodiment in accordance with the present invention, it is understood that the same is not limited thereto but is susceptible to numerous changes and modifications as known to those skilled in the art. Therefore, I do not wish to be limited to the details shown and described herein, but intend to cover all such changes and modifications as are encompassed by the scope of the appended claims.

I claim:

1. A pneumatically servoed gas pressure regulator capable of providing a relatively wide range of gas flow rates with precision outlet pressure control, said regulator comprising:

a dome loaded gas pressure regulator having an inlet for the flow of pressurized gas to be regulated, an outlet for the flow of pressurized gas regulated by said regulator, a control valve-seat assembly for adjusting the size of a passage for pressurized gas in said regulator to control the flow of pressurized gas through said regulator, and means for receiving a control signal gas pressure from a supply of pressurized control signal gas and adjusting the size of said passage at said control valve-seat assembly for creating a regulator outlet gas pressure proportional to the control signal gas pressure, and pressure sensor controller means for sensing the regulator outlet gas pressure, comparing it to a pressure setting of said controller means, and operating a pneumatic servo valve of said controller means for generating the control signal dome gas pressure from said supply of pressurized control signal gas for said dome loaded gas pressure regulator as a function of the deviation between said sensed outlet pressure and said pressure setting of said controller means.

2. The regulator according to claim 1, wherein said dome loaded gas pressure regulator and said pressure sensor controller means are integrated into a unit with inlet and outlet fittings for convenient incorporation into a gas delivery line.

3. The regulator according to claim 1, wherein said pressure sensor controller means generates said control signal dome gas pressure independently of the regulator gas through flow rate.

4. The regulator according to claim 1, wherein said pressure sensor controller means generates a control signal gas pressure for creating a relatively large change in the size of said passage in said regulator with only a relatively small deviation of less than or equal to a few psi between said sensed outlet pressure and said pressure setting.

5. The regulator according to claim 4, wherein said relatively large change in the size of said passage effectively uses at least substantially the full flow capacity $C_v$ of said dome loaded gas pressure regulator for precisely controlling the regulator outlet gas pressure over said relatively wide range of gas flow rates.

6. The regulator according to claim 1, wherein said pressure sensor controller means includes a servo sensor diaphragm having one side in communication with the regulator output pressure for sensing the regulator outlet pressure and with a pressure according to said pressure setting of said controller means acting on an opposite side of said diaphragm.

7. The regulator according to claim 6, wherein said pressure sensor controller means further includes a servo control mechanism which is moved in response to movement of said servo sensor diaphragm for operating said pneumatic servo valve.

8. The regulator according to claim 7, wherein said servo control mechanism comprises a control lever actuated by movement of said diaphragm and a pin control assembly with a pin which is axially moved by said control lever for operating said pneumatic servo valve.

9. The regulator according to claim 1, wherein said pressure sensor controller means further comprises a dome pressure bleed control for bleeding said control signal gas pressure from said dome loaded gas pressure regulator.

10. The regulator according to claim 1, wherein said relatively wide range of gas flow rates is at least 1000 L/min.

11. The regulator according to claim 10, wherein an outlet pressure drop over said relatively wide range of gas flow rates for a given pressure setting of said controller means does not exceed 5 psi.

12. The regulator according to claim 1, wherein for a given gas flow rate said regulator controls said outlet pressure within ±0.25 psi for a given pressure setting of said controller means.

13. The regulator according to claim 1, wherein said control signal dome gas pressure is at least 20 psi greater than a maximum required outlet pressure of said regulator.

14. The regulator according to claim 1, wherein the passages for gas flow from said inlet to said outlet of said regulator are formed of electropolished stainless steel.

15. The regulator according to claim 1, wherein said controller means stops the flow of pressurized gas through the regulator in the event of an interruption in the supply of said control signal gas pressure.

16. An apparatus for supplying process gases to equipment for making semiconductors, said apparatus comprising a bulk supply of a relatively high pressure process gas for making semiconductors, and a pneumatically servoed gas pressure regulator connected to said bulk supply for providing a single stage pressure reduction of the process gas over a relatively wide range of gas flow rates with precision outlet pressure control to the semiconductor making equipment, said regulator comprising a dome loaded gas pressure regulator having an inlet for the flow of pressurized gas from said bulk supply to be regulated, an outlet for the flow of pressurized gas regulated by said regulator to semiconductor making equipment, a control valve-seat assembly for adjusting the size of a passage for pressurized gas in said regulator to control the flow of pressurized gas through said regulator, and means for receiving a control signal dome gas pressure from a supply of pressurized control signal gas and adjusting the size of said passage at said control valve-seat assembly for creating a regulator outlet gas pressure proportional to the control signal gas pressure, and pressure sensor controller means for sensing the regulator outlet gas pressure, comparing it to a pressure setting of said controller means, and operating a pneumatic servo valve of said controller means for generating the control signal dome gas pressure from said supply of pressurized control signal gas for said dome loaded gas pressure regulator as a function of the deviation between said sensed outlet pressure and said pressure setting of said controller means.

* * * * *